United States Patent
Li et al.

(10) Patent No.: US 6,493,140 B1
(45) Date of Patent: Dec. 10, 2002

(54) POLARIZATION SPLITTER AND COMBINER AND OPTICAL DEVICES USING THE SAME

(75) Inventors: Wei-Zhong Li, San Jose, CA (US); Yanfeng Yang, Sunnyvale, CA (US); Feng Liu, Sunnyvale, CA (US); Wei Luo, Chicago, IL (US)

(73) Assignee: Oplink Communications, Inc., San Jose ( * ) Notice: Subject to any disclaimer, the term of this patent is extended or adjusted under 35 U.S.C. 154(b) by 0 days.

(21) Appl. No.: 09/418,136

(22) Filed: Oct. 14, 1999

(51) Int. Cl.[7] ............................. G02B 27/28; G02B 6/27
(52) U.S. Cl. ....................... 359/495; 359/494; 359/497; 385/27; 385/33
(58) Field of Search ................... 359/494, 495, 359/496, 497; 385/27, 134, 15, 24, 11, 34, 33, 35

(56) References Cited

U.S. PATENT DOCUMENTS

| | | | | |
|---|---|---|---|---|
| 5,499,132 A | * | 3/1996 | Tojo et al. | 359/495 |
| 5,499,307 A | * | 3/1996 | Iwatsuka | 359/494 |
| 5,574,595 A | * | 11/1996 | Kurata et al. | 359/494 |
| 5,581,403 A | * | 12/1996 | Kobayashi et al. | 359/496 |
| 5,675,683 A | * | 10/1997 | Takahashi et al. | 385/78 |
| 6,014,256 A | * | 1/2000 | Cheng | 359/494 |
| 6,014,475 A | * | 1/2000 | Frisken | 385/11 |
| 6,055,104 A | * | 4/2000 | Cheng | 359/494 |
| 6,175,448 B1 | * | 1/2001 | Xie et al. | 359/497 |

FOREIGN PATENT DOCUMENTS

| | | | |
|---|---|---|---|
| JP | 57-68804 A | * | 4/1982 |
| JP | 57-056813 A | * | 4/1982 |

\* cited by examiner

*Primary Examiner*—John Juba, Jr.
(74) *Attorney, Agent, or Firm*—Lumen Intellectual Property Services, Inc.

(57) ABSTRACT

A polarization splitter and combiner for processing a beam containing a first polarization and a second polarization to spatially separate these polarizations by using a birefringent element for receiving the beam and walking off the first polarization from the second polarization by an initial walk-off distance. A first lensing element with an optical axis is oriented to admit the first polarization at a first input point and output the first polarization at a first output angle to the optical axis and the second polarization at a second output angle to the optical axis. A second lensing element positioned after the first lensing element is oriented to receive the polarizations at input angles equal to their respective output angles, and outputs both polarizations at a first and second output point respectively. In a symmetrical arrangement, the first and second output points are separated by the initial walk-off distance. Additional walk-off control elements and optics can be interposed between the first and second lensing elements, depending on the functionality of the beam splitter and combiner or optical device employing the same.

4 Claims, 3 Drawing Sheets

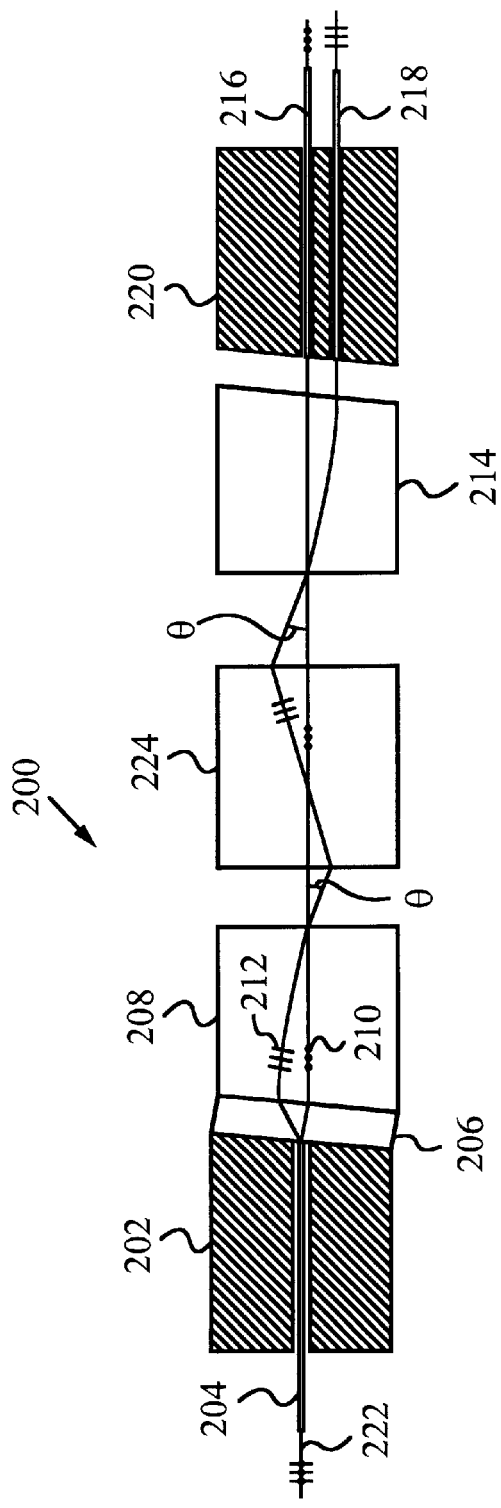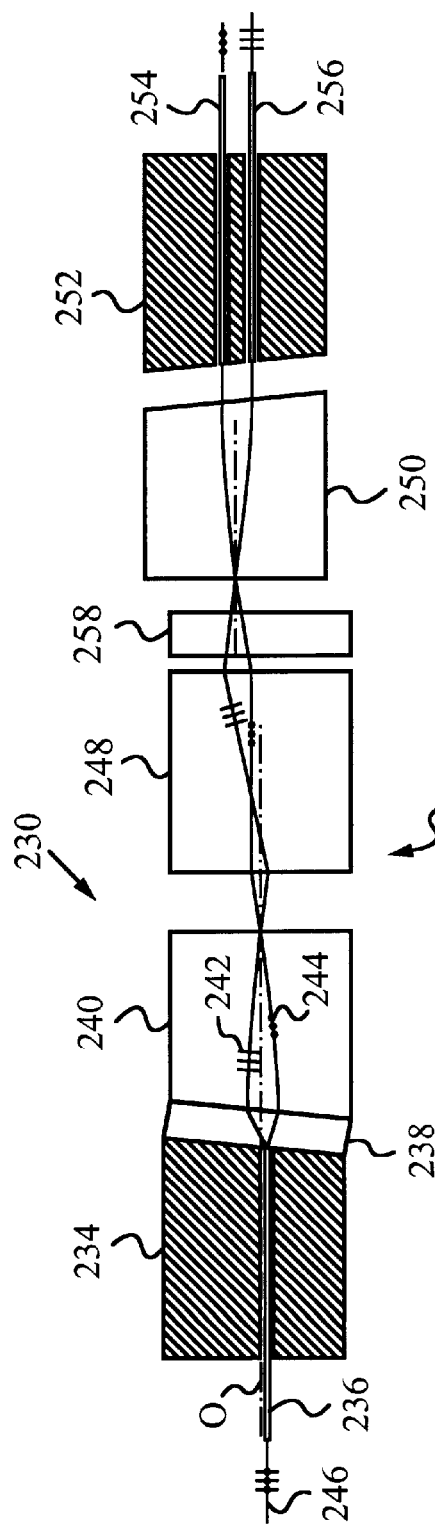

POLARIZATION SPLITTER AND COMBINER AND OPTICAL DEVICES USING THE SAME

FIELD OF THE INVENTION

This invention relates generally to optical polarization splitters, and in particular to polarization splitters using birefringent elements.

BACKGROUND OF THE INVENTION

The rapid acceptance of optical fiber has led to a variety of actual and proposed optical communications systems. Some of these include CATV, fiber to the home (FTTH), wavelength division multiplexed (WDM) and dense wavelength division multiplexed (DWDM) systems as well as coherent communications systems. These technologies require versatile optical devices to perform various operations including isolating and routing of light beams. Many of the requisite devices, i.e., optical isolators and circulators, rely on polarization splitting to perform their functions. Specifically, many of these devices use a birefringent element, such as a birefringent crystal, to separate two orthogonal polarizations, e.g., the s-polarization and the p-polarization, contained in the beam. The separation occurs as the light beam propagates through the birefringent element.

The principles of birefringence or double refraction are well-known. Inside the birefringent material one of the orthogonal polarizations travels as an ordinary wave (o-wave) and the other travels as an extraordinary wave (e-wave). The o-wave experiences a different index of refraction than the e-wave; hence the two are refracted or bent by a different angle while propagating through the birefringent material. As a result, the e-wave is spatially separated from the o-wave and the separation or walk-off distance grows in a generally linear fashion with the distance traveled in the birefringent material.

After propagating through a length of birefringent medium the two orthogonal polarizations are thus walked-off by a sufficiently large distance that they can be processed separately by subsequent optical components. For example, typical optical circulators and isolators use reciprocal and non-reciprocal polarization rotating elements to perform different operations on the two walked off polarizations. Details about such devices can be found in numerous prior art publications, some of which include: Yohji Fuji, "Polarization Independent Optical Circulator having High Isolation over a Wide Wavelength Range", IEEE Photonics Technology Letters, Vol. 4, No. 2, February 1992; U.S. Pat. No. 5,471,340 to Cheng et al.; U.S. Pat. No. 5,319,483 to Krasinski; U.S. Pat. No. 5,212,586 to Van Delden; U.S. Pat. No. 4,464,022 to Emkey; U.S. Pat. No. 4,650,289 to Kuwahara; U.S. Pat. No. 5,204,771 to Koga; U.S. Pat. No. 5,689,593 to Pan, U.S. Pat. No. 5,930,039 to Li.

While expense and device dimensions are important in nearly all applications, they are particularly critical in high volume, low-cost projects such as FTTH. The polarization splitter (which functions as a polarization combiner for returning polarizations) used in the present devices utilizes a long birefringent crystal to achieve sufficient walk-off for further processing. Hence, the size and cost of the devices built with present polarization splitters present an obstacle to further advances in optical devices.

In view of the above, what is required is a polarization splitter or combiner which achieves large walk-off over short distances. This would permit further miniaturization of optical devices which require polarization separation. Additionally, a smaller polarization splitter would use shorter blocks of birefringent material and thus be more cost effective.

OBJECTS AND ADVANTAGES OF THE INVENTION

Accordingly, it is a primary object of the present invention to provide an apparatus for spatial polarization separation, e.g., a polarization splitter and combiner which utilizes a short birefringent element. The splitter of the invention advantageously achieves a significant walk-off distance between two polarizations over a short length.

It is a further object of the invention to provide a polarization splitter which is low-cost and has small dimensions. The splitter should be easy to deploy in optical devices which require polarization splitting and/or combining.

The above objects and advantages, as well as numerous improvements attained by the apparatus and method of the invention are pointed out below.

SUMMARY

These objects and advantages are secured by a polarization splitter for processing a beam containing a first polarization and a second polarization to spatially separate these polarizations. Typically, those two polarizations will be orthogonal, such as the s- and p-polarizations. The splitter has a first optical element, e.g., an optical fiber, for delivering the beam and a birefringent element for receiving the beam and walking off the first polarization from the second polarization by an initial walk-off distance. A first lensing element such as a graded index lens (GRIN) with an optical axis is oriented to admit the first polarization at a first input point and output the first polarization at a first output angle to the optical axis. Likewise, the first lensing element admits the second polarization at a second input point and outputs it at a second output angle to the optical axis. The first and second input points are separated by the initial walk-off distance.

To enjoy the full benefits of the splitter of the invention, it preferably has a second lensing element, which can also be a GRIN lens, positioned after the first lensing element. The second lensing element is set up to receive the first polarization at a first input angle equal to the first output angle from the first lensing element. The second lensing element also receives the second polarization at a second input angle equal to the second output angle, and outputs both polarizations at a first and second output point respectively. In a symmetrical arrangement, the first and second output points can be separated by the initial walk-off distance. A second and third optical elements, e.g., second and third optical fibers, can be located at the first and second output points to receive the separated first and second polarizations respectively. When using fibers, it is advantageous to use sleeves with appropriate bores for holding them.

The splitter can have additional optics located between the first and second lensing elements. These optics can include devices which perform polarization rotation functions, filtering functions or indeed any desired functions of the first and second polarizations. However, it is important to ensure that the first and second output angles from the first lensing element are equal to the first and second input angles at the second lensing element.

Additionally, the walk-off or spatial separation between the polarizations should be controlled. A control device, such as a second birefringent element can serve this function.

In one embodiment, the first lensing element of the splitter can be positioned such that the first input point is on the optical axis. In this situation, the first output angle is zero.

In order to limit losses the elements of the splitter can be positioned at slant angles. For example, the birefringent element can be mounted at a slant angle δ. Likewise, the lensing elements can have input facets inclined at slant angle δ.

The polarization splitter can be used as a polarization combiner in accordance with the invention to combine the first and second polarizations emitted from two optical elements, e.g., the second and third optical fibers. The first lensing element performs its function by admitting the first polarization at a first input angle to its optical axis and outputting it at a first output point. The second polarization is admitted at a second input angle to the optical axis and output at a second output point. The output points are separated by the initial walk-off distance, such that the birefringent element combines the polarizations to form the beam which is supplied to the first optical element or first optical fiber.

The combiner can have the same additional elements as the splitter as well as additional optics including additional birefringent elements positioned between the first and second lensing elements.

The splitter and combiner of the invention can be used in more complex optical devices which employ the splitter and combiner for separating polarizations before performing other functions.

The particulars of the invention and its various embodiments are described in detail in the detailed description section with reference to the attached drawing figures.

DESCRIPTION OF THE FIGURES

FIG. 5 is a plan view of another optical beam splitter and combiner according to the invention.

FIG. 6 is a plan view of an optical device using a beam splitter and combiner according to the invention.

DETAILED DESCRIPTION

Figure 1:
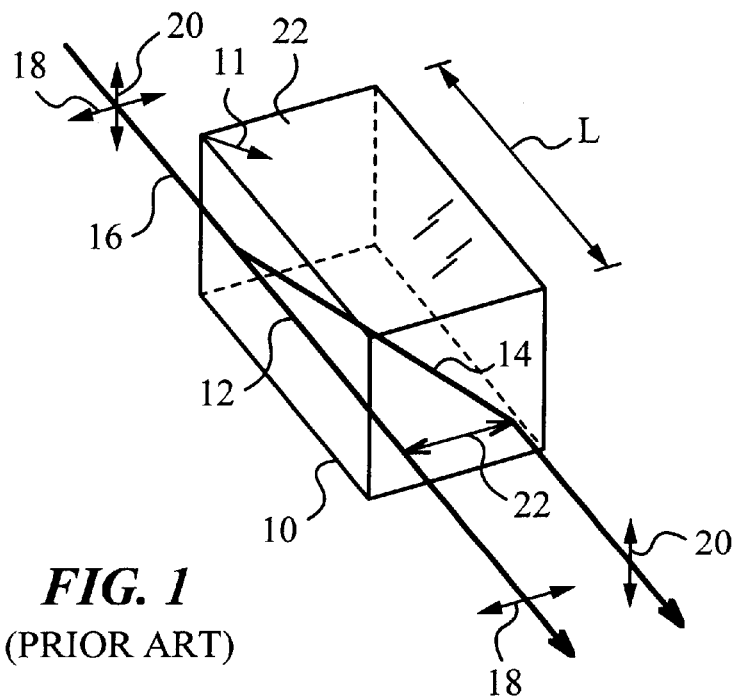
FIG. 1 (prior art) illustrates the use of a birefringent. crystal block in for walking off two orthogonal polarizations.

To appreciate the invention it is useful to review FIG. 1, which illustrates how a birefringent element 10, such as a birefringent crystal with an optic axis 11 walks off an ordinary wave 12 from an extraordinary wave 14. In this case a light beam 16 containing two orthogonal polarizations 18 and 20 enters birefringent element 10. With the orientation of optic axis 11 as shown, polarization 18 is ordinary and hence follows the propagation path of ordinary wave 12. Polarization 20 is extraordinary and hence follows the propagation path of extraordinary wave 14.

The propagation paths of ordinary wave 12 and extraordinary wave 14 diverge linearly. Hence, after propagating through a length L of crystal 10 polarizations 18 and 20 emerge separated or walked-off by a walk-off distance 22. To achieve larger walk off, the length L of crystal 10 would have to be correspondingly longer.

Figure 2:
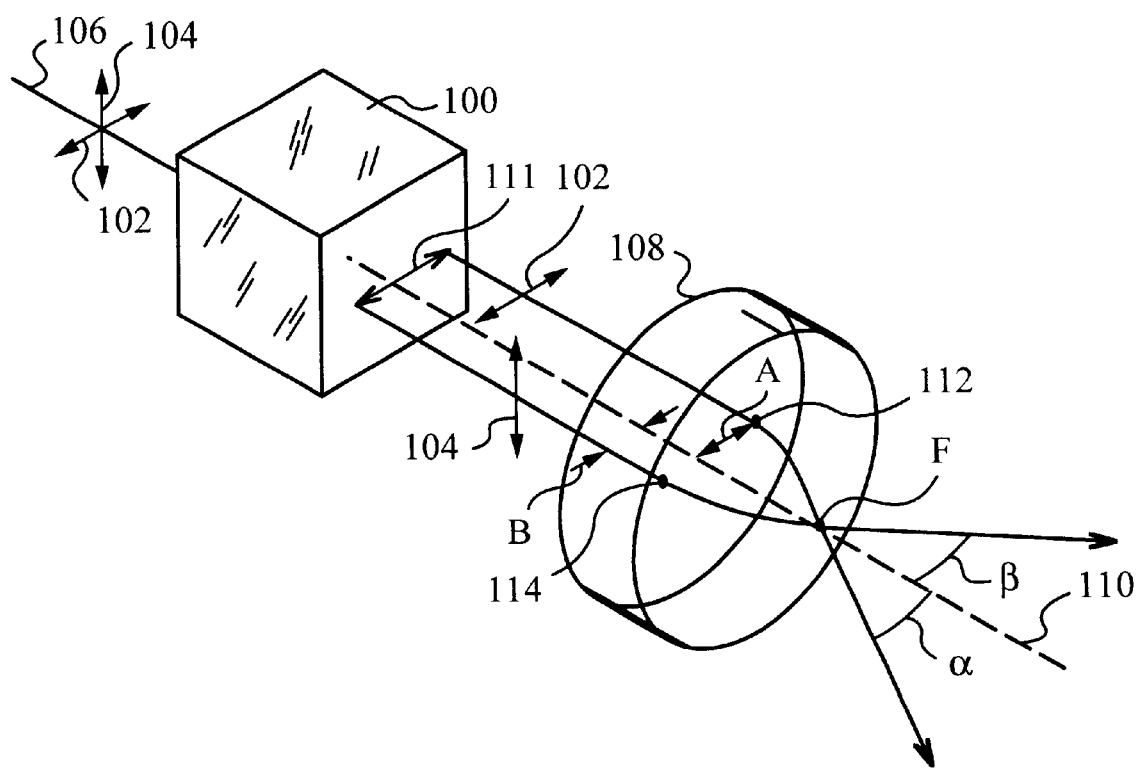
FIG. 2 is an isometric view illustrating the general principles of the invention.

FIG. 2 illustrates the general principles of the invention. A birefringent element 100, for example a birefringent crystal or any other suitable material capable of walking off different polarizations, such as two orthogonal polarizations 102, 104 is placed in the path of light beam 106 containing polarizations 102, 104. Light beam 106 can be delivered by any suitable means, e.g., an optical element such as a waveguide in the form of an optical fiber. Birefringent element 100 separates polarization 102 from polarization 104 by an initial walk-off distance 111.

A lens 108 is placed in the path of polarizations 102, 104 walked-off by initial walk-off distance 111. Lens 108 has an optical axis 110 and is of the type which converts distances from optical axis 110 to angles. For this reason lens 108 is sometimes referred to as a Fourier type lens. Specifically, polarization 102 enters lens 108 at a first input point 112 which is a distance A away from optical axis 110. Polarization 102 is output at an angle α to optical axis 110. Polarization 104 enters lens 108 at a second input point 114 a distance B away from optical axis 110 and is output at an output angle β to optical axis 110.

Birefringent element 100 walks off polarizations 102 and 104 in a generally linear fashion and only while they propagate through it. Hence, walk-off distance 111 is essentially equal to the separation between input points 112 and 114. In other words, walk-off distance 111 is at most equal to A+B.

Since lens 108 converts distances to angles, polarizations 102 and 104 continue to diverge at an angle α+β with respect to each other upon exiting lens 108. Therefore, further spatial separation of polarizations 102, 104 is achieved outside birefringent element 100 and lens 108. For this reason lens 108 is preferably located very close or right against birefringent element 100 to start further separating polarizations 102, 104 as soon as they emerge from birefringent element 100.

Upon entry into lens 108 polarizations 102, 104 are first bent towards optical axis 110 and focussed at focal point F of lens 108. Focal point F is preferably at the surface of lens 108 or outside lens 108. Thus initial walk-off 111 achieved by birefringent element 100 is annulled at focal point F. A relatively small thickness of lens 108 is sufficient to obtain an initial walk-off 111 for which distances A and B lead to significant angles α and β and thus allow for efficient separation of polarizations 102 and 104.

Figure 3:
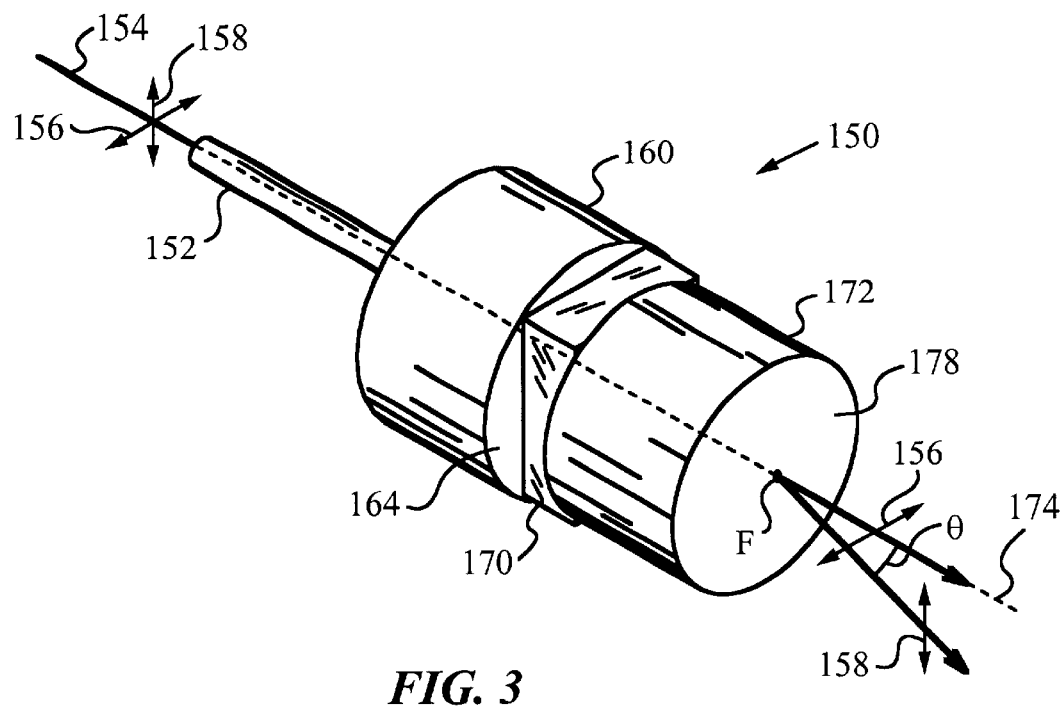
FIG. 3 is an isometric view of a preferred beam splitter and combiner in accordance with the invention.
Figure 4:
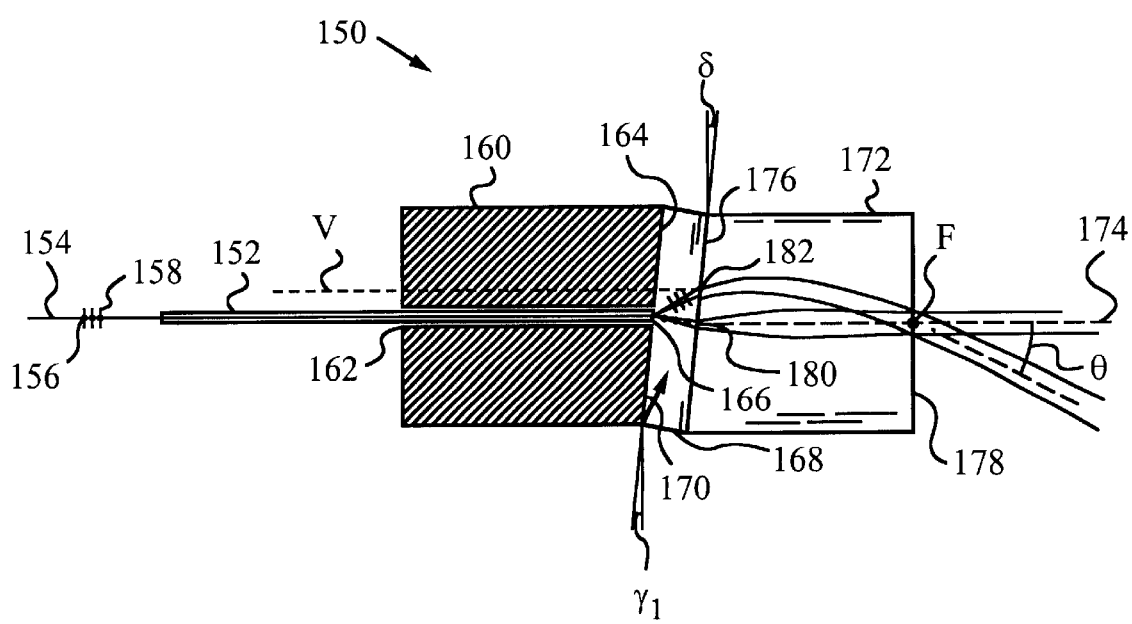
FIG. 4 is a cross sectional view of the beam splitter and combiner shown in FIG. 3.

FIGS. 3 and 4 illustrate a preferred embodiment of a beam splitter 150 according to the invention. A first optical fiber 152 delivers a beam 154 containing a first polarization 156 and a second polarization 158. Polarizations 156, 158 are the s- and p-polarizations respectively. A ferrule or sleeve 160 with a bore or through-hole 162 for receiving optical fiber 152 is provided. Sleeve 160 has an end face 164. Fiber 152 has an end facet 166 which is polished to be in the same plane as end face 164. In order to minimize back reflections both end face 164 and end facet 166 are preferably inclined at a slant angle $\gamma_1$. Slant angle $\gamma_1$ should be on the order of several degrees or more. A person of average skill in the art will be able to determine the appropriate value given the specific design based on well-known considerations.

A birefringent crystal 168 having an optic axis 170 is positioned right next to sleeve 160. In fact, crystal 168 preferably abuts end face 164 of sleeve 160 and/or is attached directly to end face 164. A lens 172, in this case a graded-index (GRIN) lens having an optical axis 174 is positioned on the other side of crystal 168 from sleeve 160. Most preferably, crystal 168 is attached to an input facet 176 of lens 172 and is thus sandwiched between sleeve 160 and lens 172. Furthermore, input facet 176 is preferably slanted at a slant angle δ to aid in preventing back reflections. Slant angle δ can be equal to slant angle $\gamma_1$ or be different from it, as required to minimize overall back reflections from beam splitter 150.

The focal point F of GRIN lens 172 is in the plane of an output facet 178 of lens 172. Also, a first input point 180 of s-polarization 156 at input facet 176 is located on optical axis 174. A second input point 182 is located away from optical axis 174. In fact, second input point 182 is located on an axis V. The separation between input points 180, 182 is equal to an initial walk-off distance. This initial walk-off distance is equal to the distance between optical axis 174 and axis V. The distance between axes 174 and V can be on the order of typical separations between optical fibers.

During operation of beam splitter 150 birefringent crystal 170 receives beam 154 and separates its polarizations 156, 158 in accordance with the above described principles. In particular, s-polarization 156 propagates along the ordinary wave path to first input point 180. Meanwhile, p-polarization 158 propagates along the extraordinary wave path to input point 182.

Because s-polarization 156 enters lens 172 on optical axis 174, it continues to propagate along optical axis 174 and exits lens 172 at a zero output angle. P-polarization 158, however, enters lens 172 at the walk-off distance away from optical axis 174 and thus exits lens 172 at an angle θ. Thus, after exiting lens 172 through output facet 178 s-polarization 156 and p-polarization 158 diverge away from each other at angle θ.

Beam splitter's 150 use of lens 172 to help separate polarizations 156, 158 originally split by the initial walk-off distance by birefringent crystal 168 enables the designer to use thin birefringent crystal 168. For example, in most applications between 1–2 mm thick crystal 168 is sufficient to ensure that initial walk-off distance is on the order of typical separation distances between optical fibers and can easily be resolved by lens 172. In contrast, prior art beam splitters use as much as 6–18 mm long birefringent elements to walk-off the polarizations. Thus, beam splitter 150 accrues a considerable space saving in comparison to prior art devices. Furthermore, because birefringent material is expensive, beam splitter 150 is also lower cost and it is easier to fabricate and align.

FIG. 5 shows a beam splitter and combiner 200 in accordance with the invention. The beam splitter and combiner 200 uses a first sleeve 202 for holding a first optical fiber 204. A birefringent element 206 and a first GRIN lens 208 are used to separate s-polarization 210 from p-polarization 212 by an initial walk-off distance. In this embodiment the focus F of lens 208 is also on the output surface of lens 208.

The first input point to lens 208 of polarization 210 is on the optical axis of GRIN lens 208. Hence, first output angle of polarization 210 from GRIN lens 208 is zero. Meanwhile, second input point to lens 208 of polarization 212 is away from the same optical axis, and the second output angle of polarization 212 from lens 208 is equal to θ. Thus, the angular separation between polarizations 210 and 212 is equal to θ. It is advantageous that beam splitter and combiner 200 does preserve the angular separation θ between polarizations 210 and 212 after they exit GRIN lens 208.

Because polarizations 210, 212 continue to diverge or walk off at angle θ (polarization 210 continues to propagate along the optical axis of GRIN lens 208 and polarization 212 continues to diverge at angle θ away from the optical axis of GRIN 208 as they propagate) splitter and combiner 200 uses a control device 224 for controlling the walk off. In this case, control device 224 is a second birefringent element. Specifically, element 224 ensures that polarizations 210, 212 do not walk off too far and that their angular separation θ is preserved.

Control element 224 also ensures that polarizations 210, 212 are incident on a second lensing element 214, e.g., a second GRIN lens, at the same first and second input angles as the first and second output angles from GRIN lens 208. In other words, the input angle for polarization 210 is zero and the input angle for polarization 212 is θ in this embodiment.

Preferably, GRIN lens 214 has the same parameters and focal point F as GRIN lens 208. Furthermore, the distance between control element 224 and GRIN lens 214 is adjusted such that polarizations 210, 212 enter GRIN lens 214 at its focal point. In this symmetrical arrangement GRIN lens 214 will output polarizations 210, 212 at first and second output points spaced apart by the same initial walk-off distance as the first and second input points to GRIN lens 208.

Second GRIN lens 214 guides separated polarizations 210 and 212 to a second optical element or fiber 216 and a third optical element or fiber 218. Second and third optical fibers 216, 218 are held in a second sleeve 220 with two bores; one for each fiber. The distance between fibers 216, 218 is equal to the initial walk-off distance.

Beam splitter and combiner 200 acts as a polarization splitter for a light beam 222 propagating from left to right. For polarizations 210 and 212 propagating from right to left, beam splitter and combiner 200 acts as a polarization combiner.

A beam splitter and combiner of the invention is superior to prior art devices in that it utilizes a short birefringent element and achieves a significant walk-off distance between two polarizations over a short length. It can also be easily manufactured at low cost and it has small dimensions. Specifically, the beam splitter and combiner of the invention is shorter and lighter than typical prior art devices.

Furthermore, a beam splitter and combiner of the invention is straightforward to deploy in optical devices which require polarization splitting and/or combining. For example, FIG. 6 illustrates an optical device 230 using a beam splitter and combiner 232 in accordance with the invention. Beam splitter has a first sleeve 234, first optical fiber 236, a birefringent crystal 238 and a first GRIN lens 240. The optical axis of lens 240 is designated by O. These components operate as described above to separate an s-polarization 242 from a p-polarization 244 contained in a beam 246 propagating from left to right.

In this embodiment, neither polarization 242 nor polarization 244 are input into lens 240 on optical axis O. Hence, each polarization exits lens 240 at a non-zero angle to optical axis O. The angular separation and walk-off between polarizations 242, 244 as they propagate through device 230 are controlled by a second birefringent element 248.

A second GRIN lens 250 having the same parameters as lens 240 is positioned past element 248 to receive polarizations 242, 244 and deliver them to second and third optical fibers 254, 256 held in the bores of a second sleeve 252. In order to couple in polarizations 242, 244 at the focal point of lens 250, lens 250 is shifted with respect to lens 240. Such adjustments will usually be required when neither input point on lens 240 is on optical axis O.

Optics 258 are positioned between first lens 240 and second lens 250. Optics 258 can be positioned on either side of birefringent element 248, e.g., wherever more space is available and they can even help in performing the function of element 248. It is important, however, that optics 258 not prevent element 248 from performing its function. In particular, it is important that polarizations 242, 244 are incident on lens 250 at its focal point and at input angles equal to their output angles from lens 240.

Optics 258 can include a filter, an isolator core or any active or passive optical device required by device 230 for performing its functions. Optics 258 can consist of several separate elements as well.

It will be clear to one skilled in the art that the above embodiment may be altered in many ways without departing from the scope of the invention. Accordingly, the scope of the invention should be determined by the following claims and their legal equivalents.

What is claimed is:

1. A polarization splitter for processing a beam comprising a first polarization and a second polarization to spatially separate said first polarization from said second polarization, said polarization splitter comprising:

a) a first optical element for delivering said beam;
   b) a birefringent element for receiving said beam from said first optical element and walking off said first polarization from said second polarization by an initial walk-off distance;
   c) a first lensing element positioned substantially against said birefringent element, said first lensing element having an optical axis and being oriented to admit said first polarization at a first input point and output said first polarization at a first output angle to said optical axis, and to admit said second polarization at a second input point and output said second polarization at a second output angle to said optical axis, whereby said first input point and said second input point are separated by said initial walk-off distance;
   d) a second lensing element positioned after said first lensing element to receive said first polarization at a first input angle equal to said first output angle and said second polarization at a second input angle equal to said second output angle, and to output said first polarization at a first output point and said second polarization at a second output point;
   e) optics between said first lensing element and said second lensing element;
   f) a second optical element located at said first output point for receiving said first polarization and a third optical element located at said second output point for receiving said second polarization.

2. The polarization splitter of claim 1, wherein said second optical element and said third optical element are optical fibers, said polarization splitter further comprising a sleeve with bores for holding said optical fibers.

3. A polarization splitter for processing a beam comprising a first polarization and a second polarization to spatially separate said first polarization from said second polarization, said polarization splitter comprising:

a) a first optical element for delivering said beam;
   b) a birefringent element for receiving said beam from said first optical element and walking off said first polarization from said second polarization by an initial walk-off distance;
   c) a first lensing element positioned substantially against said birefringent element, said first lensing element having an optical axis and being oriented to admit said first polarization at a first input point and output said first polarization at a first output angle to said optical axis, and to admit said second polarization at a second input point and output said second polarization at a second output angle to said optical axis, whereby said first input point and said second input point are separated by said initial walk-off distance;
   d) a second lensing element positioned after said first lensing element to receive said first polarization at a first input angle equal to said first output angle and said second polarization at a second input angle equal to said second output angle, and to output said first polarization at a first output point and said second polarization at a second output point;
   e) optics between said first lensing element and said second lensing element;

wherein said optics comprise a control device for controlling the walk-off between said first polarization and said second polarization;

wherein said control device is a second birefringent element.

4. A polarization splitter for processing a beam comprising a first polarization and a second polarization to spatially separate said first polarization from said second polarization, said polarization splitter comprising:

a) a first optical element for delivering said beam;
   b) a birefringent element for receiving said beam from said first optical element and walking off said first polarization from said second polarization by an initial walk-off distance;
   c) a first lensing element positioned substantially against said birefringent element, said first lensing element having an optical axis and being oriented to admit said first polarization at a first input point and output said first polarization at a first output angle to said optical axis, and to admit said second polarization at a second input point and output said second polarization at a second output angle to said optical axis, whereby said first input point and said second input point are separated by said initial walk-off distance;
   d) a second lensing element positioned after said first lensing element to receive said first polarization at a first input angle equal to said first output angle and said second polarization at a second input angle equal to said second output angle, and to output said first polarization at a first output point and said second polarization at a second output point;
   e) optics between said first lensing element and said second lensing element;

wherein said first input point is substantially on said optical axis and said first output angle is zero.

* * * * *